United States Patent [19]

Hill

[11] Patent Number: 4,674,020
[45] Date of Patent: Jun. 16, 1987

[54] POWER SUPPLY HAVING DUAL RAMP CONTROL CIRCUIT

[75] Inventor: Lorimer K. Hill, Cupertino, Calif.

[73] Assignee: Siliconix Incorporated, Santa Clara, Calif.

[21] Appl. No.: 808,575

[22] Filed: Dec. 13, 1985

[51] Int. Cl.$^4$ .......................................... H02M 3/335
[52] U.S. Cl. .................................... 363/21; 323/222; 323/288
[58] Field of Search .............. 323/242, 243, 222, 282, 323/283, 288; 363/18-21, 74, 78

[56] References Cited

U.S. PATENT DOCUMENTS

| | | | |
|---|---|---|---|
| 4,180,852 | 12/1979 | Koizumi et al. | 323/282 X |
| 4,272,805 | 6/1981 | Iguchi et al. | 363/19 |
| 4,422,138 | 12/1983 | Kornrumpf | 363/21 |
| 4,435,746 | 3/1984 | Barnett | 363/21 |
| 4,447,841 | 5/1984 | Kent | 361/18 |
| 4,453,206 | 6/1984 | Voight | 363/21 |

OTHER PUBLICATIONS

Hsu et al., "Modelling and Analysis of Switching DC-to-DC Converters in Constant-Frequency Current-Programmed Mode", *IEEE Power Electronics Conference*, Jun., 1979.

Hill, et al., "Two SMPS Integrated Circuits for Telecommunications Applications".

*Primary Examiner*—Patrick R. Salce
*Assistant Examiner*—Marc S. Hoff
*Attorney, Agent, or Firm*—Kenneth E. Leeds; Alan H. MacPherson; Steven F. Caserza

[57] ABSTRACT

A power supply (100) includes a first lead (12) for receiving an input voltage (Vin) and an inductor (L1) and a switching transistor (Q1) coupled in series between the input lead and ground. The node (N1) between the inductor (L1) and switching transistor (Q1) is coupled through a diode (D1) to an output terminal (14). When the switching transistor is on current flow causes energy to be stored in the inductor. When the switching transistor turns off, the energy stored in the inductor is provided to a load (RL) coupled to the output terminal. The on-time of the transistor is controlled by a comparator (20) which receives a first voltage (V3) proportional to the current through the switching transistor and a second voltage (V4). The second voltage decreases linearly with respect to time at a rate dependent on the difference between the voltage at the output terminal (Vout) and a reference voltage (Vref). Because of this, the power supply is insensitive to voltage spikes which may appear on the first input lead of the comparator.

16 Claims, 12 Drawing Figures

4,674,020

POWER SUPPLY HAVING DUAL RAMP CONTROL CIRCUIT

BACKGROUND OF THE INVENTION

This invention relates to power supplies and more specifically to switching power supplies.

It is known in the art to provide switching power supplies such as power supply 10 of FIG. 1 which receives a first DC voltage Vin on an input terminal 12 and generates therefrom a second DC voltage Vout on an output terminal 14. Power supply 10 provides output voltage Vout across a load modeled as resistor RL.

Power supply 10 includes an inductor L1 coupled between input terminal 12 and a node N1. Coupled between node N1 and ground is an N channel MOS transistor Q1 and a resistor R1. Transistor Q1 periodically turns on and off in response to a signal from a logic circuit 16. When transistor Q1 is on, current flows through input terminal 12, inductor L1, transistor Q1, and resistor R1. Since the resistance of resistor R1 is small, most of the voltage drop Vin appears across inductor L1. As is known in the art, when a constant voltage is applied across an inductor, the current through the inductor increases linearly with time. Thus, the current through inductor L1 increases until transistor Q1 turns off. When transistor Q1 turns off, current flows through input terminal 12, through inductor L1, through a diode D1, and through parallel connected output capacitor C1 and load RL. The amount of power delivered to load RL depends upon the amount of energy stored in inductor L1 when transistor Q1 turns off, which in turn depends upon the amount of time that transistor Q1 remains on during each switching cycle of transistor Q1. Diode D1 prevents output capacitor C1 from discharging through transistor Q1 or inductor L1.

Transistor Q1 turns on and off at a constant frequency but with a duty cycle which varies in response to output voltage Vout. Specifically, transistor Q1 turns on in response to a clock signal CLK received on a clock terminal 17 and turns off in response to output voltage Vout. Thus, if output voltage Vout decreases, the on-time of transistor Q1 increases, thereby causing inductor L1 to store more energy during each cycle while transistor Q1 is on, and thus causing inductor L1 to deliver more power to load RL when transistor Q1 is off. Conversely, if output voltage Vout increases, the on-time of transistor Q1 decreases, causing inductor L1 to deliver less power to load RL.

Power supply 10 includes a voltage divider which includes resistors R2 and R3 and provides voltage V1 proportional to output voltage Vout. Voltage V1 is compared to a reference voltage Vref by an amplifier 18 which generates a voltage V2 proportional to the difference between voltage V1 and reference voltage Vref. Voltage V2 is presented to an inverting input lead of a comparator 20. The noninverting input lead of comparator 20 receives a voltage V3 present at the node between transistor Q1 and resistor R1. The relationship between voltage V2, voltage V3, clock signal CLK and the on-time of transistor Q1 is illustrated in the timing diagram of FIG. 2.

Referring to FIG. 2, it is seen that when transistor Q1 turns on in response to the rising clock signal CLK, a short voltage spike S1 appears across resistor R1 for two reasons First, because of the gate-source capacitance of transistor Q1, when a high voltage is first applied to the gate of transistor Q1 causing transistor Q1 to turn on, a pulse appears at the source of transistor Q1 and therefore across resistor R1. Second, because of the capacitance of the various elements coupled to node N1, when transistor Q1 first turns on, the change in voltage on this capacitance at node N1 causes current to flow through transistor Q1 and resistor R1, adding to the voltage spike across resistor R1.

Following the settling of voltage spike S1, voltage V3 across resistor R1 steadily increases because when transistor Q1 is on, the current through inductor L1 increases linearly with time and therefore, the current through resistor R1, and thus voltage V3 across resistor R1, increases linearly with time. When voltage V3 increases past voltage V2 (as described above, voltage V2 is proportional to the difference between voltage V1 and reference voltage Vref), the output signal from comparator 20 provides a pulse to logic circuit 16 causing logic circuit 16 to turn off transistor Q1. Transistor Q1 remains off until the next rising edge of clock signal CLK, at which time transistor Q1 turns on again and remains on until comparator 20 provides another pulse to logic circuit 16.

If output voltage Vout decreases, the difference between voltage Vref and voltage V1 increases, voltage V2 increases (e.g. to a value V2' illustrated in FIG. 2), and therefore, transistor Q1 remains on for a longer period of time. Because of this, during the on-time of transistor Q1, more energy is stored in inductor L1, which means that more energy is provided to output load RL each cycle when transistor Q1 is turned off. In this way, power supply 10 counteracts a decrease in output voltage Vout by providing more power to load RL, and vice versa. Of importance, switching transistor Q1 is always off when clock signal CLK is low, preventing switching transistor Q1 from having a duty cycle greater than the duty cycle of clock signal CLK, thereby allowing time for energy stored in inductor L1 to be transferred to load RL and preventing excessive current through and destruction of transistor Q1.

As can be seen in FIG. 2, if voltage spike S1 is greater than voltage V2, comparator 20 cannot distinguish between spike S1 and the normal voltage ramp associated with the waveform of voltage V3. Accordingly, if voltage spike S1 becomes greater than voltage V2, comparator 20 will provide a pulse to logic circuit 16 almost immediately after transistor Q1 turns on, thereby causing comparator 20 to fail to regulate output voltage Vout properly.

SUMMARY

A switching power supply constructed in accordance with one embodiment of the present invention includes a first lead for receiving an input voltage coupled to ground through an inductor, a switching transistor, and a resistor. The node between the inductor and the switching transistor is connected to an output terminal via a diode. The switching transistor turns on in response to a clock signal and turns off in response to a pulse from a comparator. The comparator has a first lead which receives a first voltage proportional to the current through the inductor. The second lead of the comparator receives a second voltage which decreases from a predetermined level at a rate dependent upon the difference between a third voltage (proportional to the power supply output voltage) and a reference voltage.

When the switching transistor first turns on, a voltage spike is typically received on the first input lead of the comparator. However, the second voltage is greater than the maximum voltage of the spike when the transistor turns on. Therefore, the power supply of the present invention regulates accurately even if the third voltage approaches the reference voltage.

In another embodiment, instead of using an inductor, a flyback transformer is used. The flyback transformer has a primary winding coupled between the input terminal and the switching transistor and a secondary winding coupled to the load. When the switching transistor is on, energy is stored in the transformer. When the switching transistor turns off, the secondary winding of the transformer provides the stored energy to the load.

DETAILED DESCRIPTION

Figure 3:
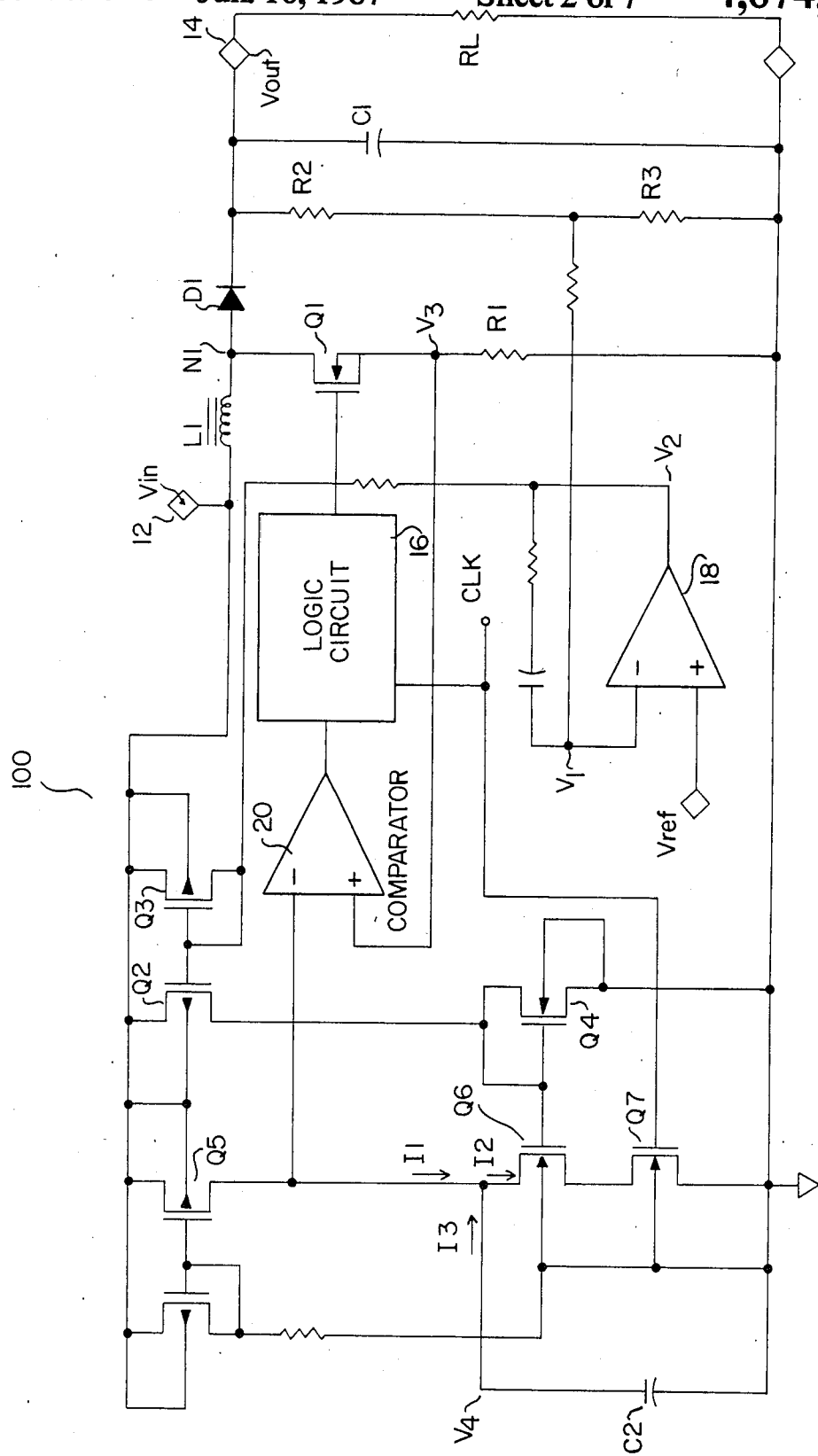
FIG. 3 is a schematic diagram of a power supply constructed in accordance with one embodiment of the present invention.

FIG. 3 illustrates a power supply 100 constructed in accordance with one embodiment of the present invention. Power supply 100 includes input terminal 12 which receives input voltage Vin and output terminal 14 which provides output voltage Vout across load RL. As is the case in prior art power supply 10, input terminal 12 is coupled to output terminal 14 via inductor L1 and diode D1. The node N1 between inductor L1 and diode D1 is coupled to ground via N channel B MOS switching transistor Q1 and resistor R1. Switching transistor Q1 periodically turns on and off. When switching transistor Q1 is on, current flows through terminal 12, inductor L1, switching transistor Q1, resistor R1, and to ground, thereby storing energy in inductor L1. When switching transistor Q1 turns off, the energy stored in inductor L1 causes current to flow through terminal 12, inductor L1, diode D1, and to parallel connected output filter capacitor C1 and load RL.

Figure 1:
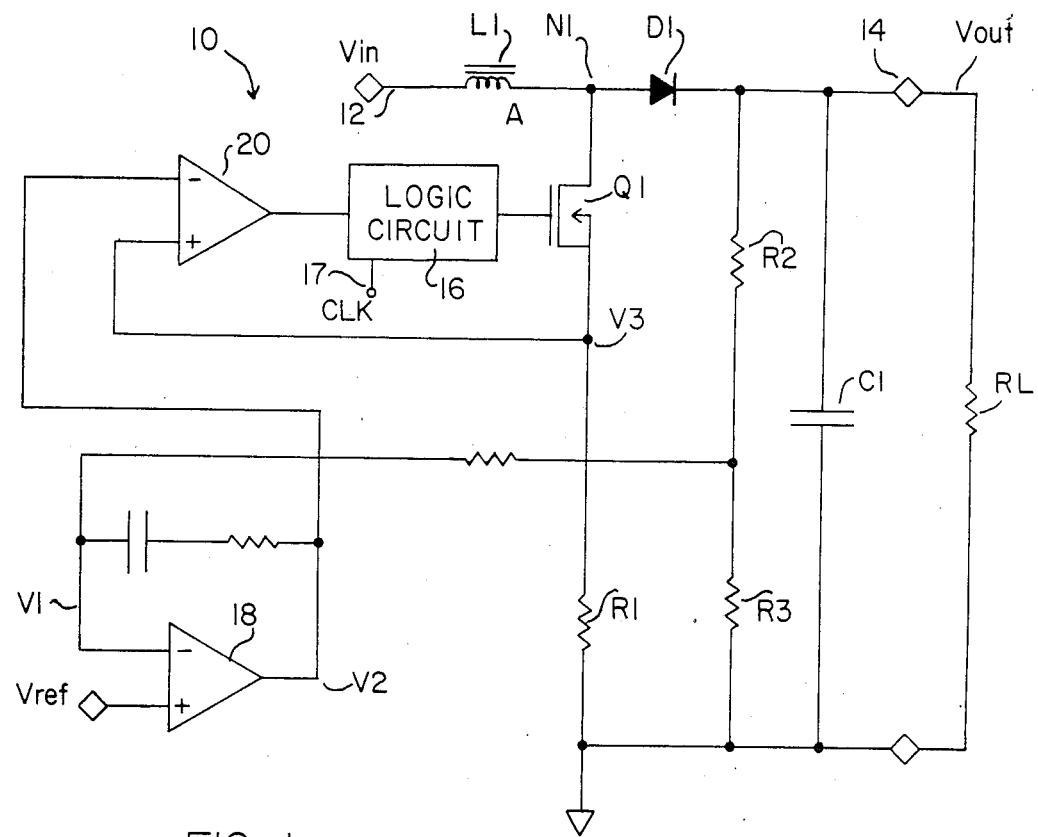
FIG. 1 is a schematic diagram of a switching power supply constructed in accordance with the prior art.
Figure 2:
FIG. 2 is a waveform diagram illustrating the relationship of various signals within the power supply of FIG. 1.
Figure 2:
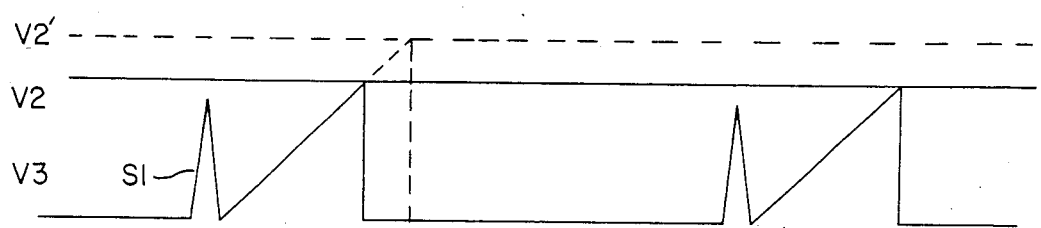
Figure 2:
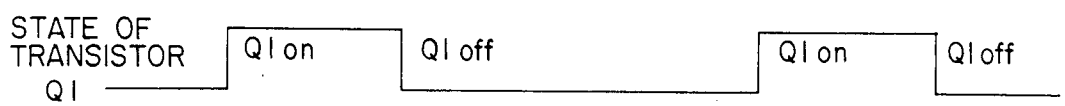

As was also the case with prior art power supply 10 of FIG. 1, power supply 100 includes a voltage divider comprising resistors R2 and R3 which provide voltage V1 proportional to output voltage Vout. Amplifier 18 generates output voltage V2 proportional to the difference between voltage V1 and reference voltage Vref. However, in contrast to the prior art circuit of FIG. 1, rather than using voltage V2 to drive the inverting input lead of comparator 20, voltage V2 controls the rate at which voltage V4 across a capacitor C2 decreases, as illustrated in the waveform diagram of FIG. 7. The voltage across capacitor C2 is coupled to the inverting input lead of comparator 20. (In one embodiment, instead of providing capacitor C2 as a separate circuit element, capacitor C2 is the capacitance exhibited by the devices coupled to the inverting input lead of comparator 20.)

Capacitor C2 is charged by a first current I1 flowing through an N channel MOS transistor Q5 and is discharged by a second current I2 flowing through series coupled N channel MOS transistors Q6 and Q7. The gate of transistor Q7 is coupled to receive clock signal CLK, and therefore, N channel MOS transistor Q7 only conducts when clock signal CLK is high. The gate of transistor Q6 receives a voltage dependent on voltage V2, thus causing transistor Q6 to conduct an amount of current dependent on voltage V2. Therefore, when clock signal CLK is high, capacitor C2 is discharged by a current I3=I2−I1, where current I2 is B dependent on voltage V2. As soon as clock signal CLK goes low, transistor Q7 turns off, current I2 equals zero, and capacitor C2 is charged by current I1 to voltage Vmax. Voltage V4 across capacitor C2 remains at voltage Vmax until clock signal CLK goes high again.

Voltage V2 controls the discharge rate of capacitor C2 as follows Voltage V2 is presented to the gates of P channel MOS transistors Q2 and Q3. Transistors Q2 and Q3 are arranged in a current mirror configuration so that the current through transistor Q2 is proportional to the current through transistor Q3. The current through transistor Q3 is inversely related to voltage V2. The drain of transistor Q2 is coupled to the drain and gate of an N channel MOS transistor Q4, and thus the current through transistor Q4 equals the current through transistor Q2. N channel MOS transistors Q4 and Q6 are arranged so that the current through transistor Q6 is approximately proportional to the current through transistor Q4 (which is proportional to the current through transistor Q3). Thus, capacitor C2 discharges through transistor Q6 at a rate dependent upon voltage V2. As mentioned above, this discharge current flows through transistors Q6 and Q7.

As described above, when switching transistor Q1 is on, voltage V3 increases linearly with time and voltage V4 across capacitor C2 decreases with time. When voltage V3 exceeds voltage V4, comparator 20 provides a pulse to logic circuit 16 which turns off switching transistor Q1. Thus, the on-time of switching transistor Q1 (and therefore the energy per cycle delivered to load RL) is dependent upon the rate at which capacitor C2 discharges, which in turn depends upon voltage V2, and thus on the output voltage Vout.

Figure 7:
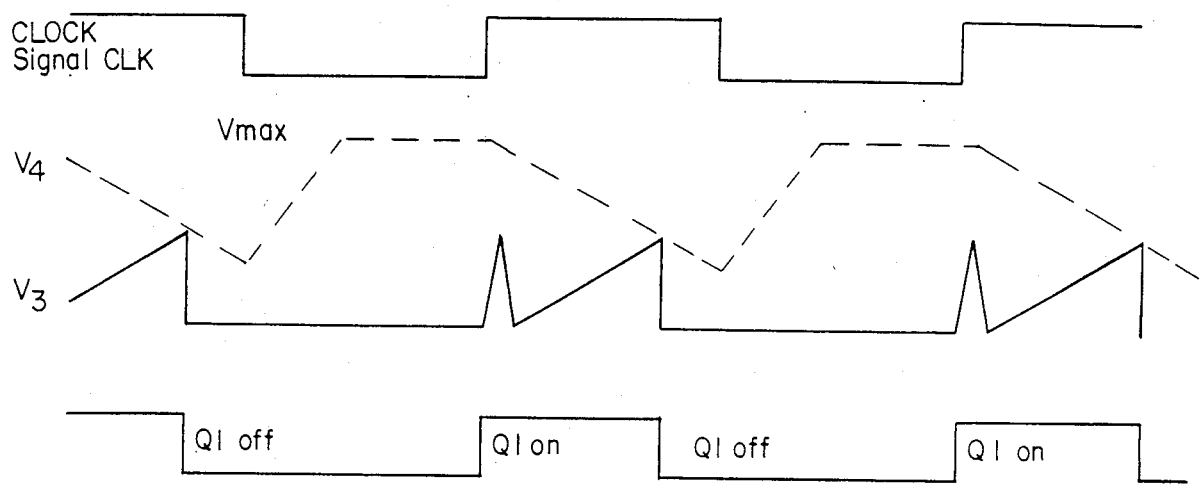
FIG. 7 is a waveform diagram illustrating the relationship of various signals within the power supply of FIG. 3.

FIG. 7 illustrates the timing relationship between various signals in the circuit of FIG. 3. When clock signal CLK goes high, switching transistor Q1 turns on and a voltage spike appears across resistor R1 (voltage waveform V3). Thereafter, voltage V3 starts increasing approximately linearly. Meanwhile, voltage V4 starts decreasing approximately linearly. As soon as voltage V3 is greater than voltage V4, switching transistor Q1 turns off and voltage V3 falls to zero. Voltage V4 continues decreasing until clock signal CLK goes low, at which time transistor Q7 turns off and voltage V4 across capacitor C2 increases to voltage Vmax.

Figure 8:
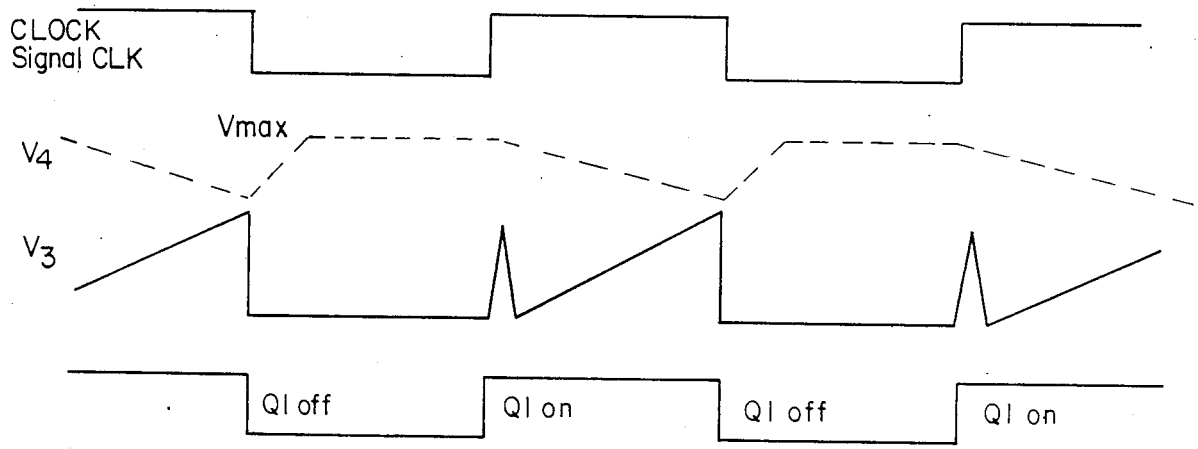
FIG. 8 is a set of waveform diagrams illustrating the relationship of various signals within the power supply of FIG. 3 when output voltage Vout is extremely low.

FIG. 8 illustrates the timing relationships of various signals within the power supply of FIG. 3 when voltage V4 decreases at a very low rate (i.e. when voltage Vout is relatively low) so that voltage V4 is never less than voltage V3. Under these circumstances, as soon as clock signal CLK goes low, logic circuit 16 turns off switching transistor Q1. In addition, clock signal CLK turns off transistor Q7, and capacitor C2 again charges up to voltage Vmax.

Figure 9:
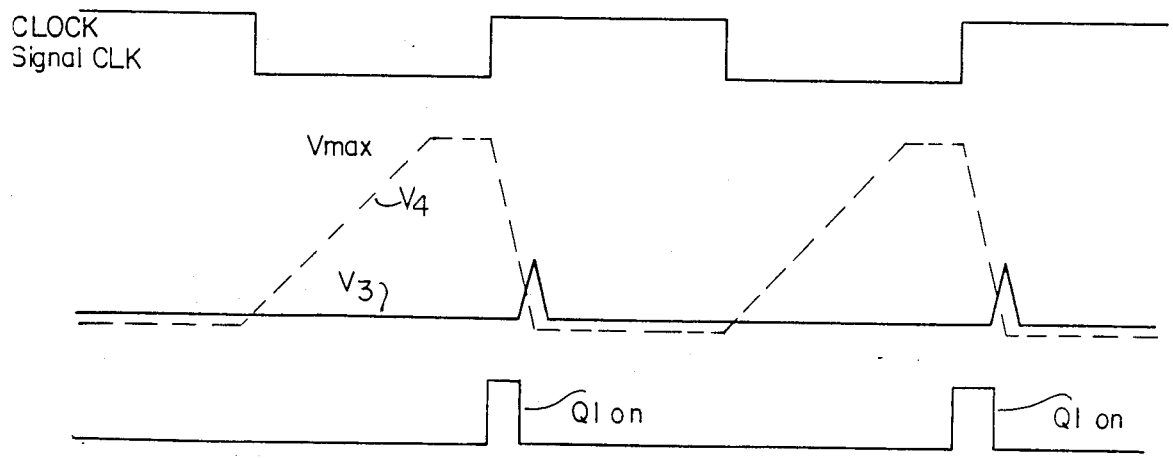
FIG. 9 is a set of waveform diagrams illustrating the relationship of various signals within the power supply of FIG. 3 when output voltage Vout is extremely high.

FIG. 9 illustrates the timing relationships when voltage V2 is so low that transistor Q1 only turns on for only a very short period of time. Voltage V2 is low when voltage Vout is high, e.g. when load RL draws very little current.

In summary, power supply 100 of FIG. 3 provides a voltage waveform V4 which decreases at a rate determined by output voltage Vout. This circuit is merely exemplary, however, and other embodiments provide a voltage to comparator 20 that changes at a rate dependent on output voltage using different circuitry.

Figure 10:
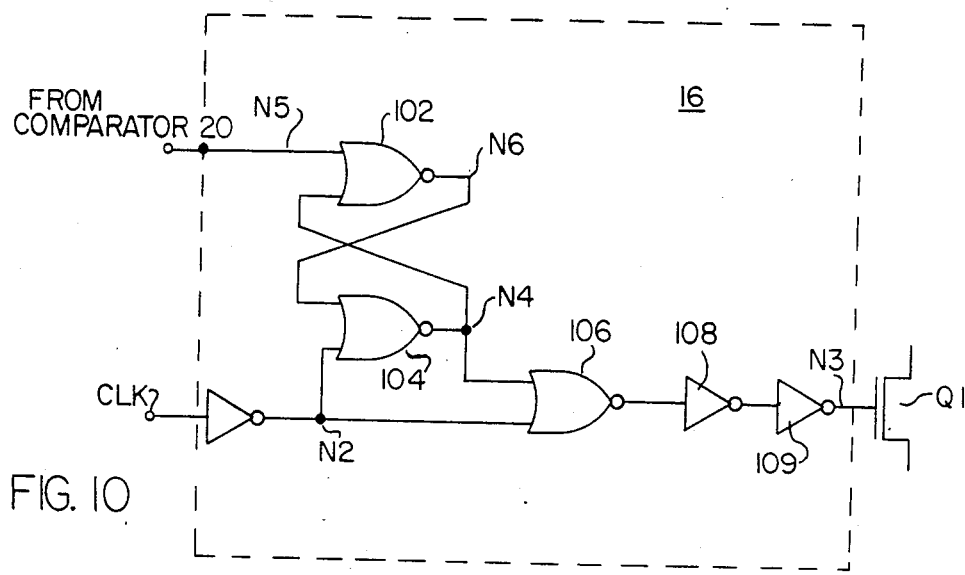
FIG. 10 is a schematic diagram of one embodiment of logic circuit 16 of the power supply of FIGS. 3, 4, 5, and 6.

FIG. 10 is a schematic diagram of one embodiment of logic circuit 16, which includes a pair of NOR gates 102 and 104 coupled to form a latch. A first input lead of NOR gate 102 receives the output signal from comparator 20 while the second input lead of NOR gate 102 receives the output signal from NOR gate 104. NOR gate 104 includes an input lead which receives the inverse of clock signal CLK and a second input lead which receives the output signal of NOR gate 102. The output signal from NOR gate 104 drives an input lead of NOR gate 106, which in turn drives N channel MOS transistor Q1 via inverting buffers 108 and 109. NOR gate 106 also includes an input lead which receives the inverse of clock signal CLK.

The operation of circuit 16 is better understood with reference to the truth table below. The designation "L" indicates that the voltage at the indicated node is low. Conversely, the designation "H" indicates that the voltage at the indicated node is high.

Referring to the truth table, while signal CLK is low, the voltage at node N2 is high, and therefore, NOR gate 106 drives node N3 (via inverting buffers 108 and 109) with a low voltage, thereby keeping transistor Q1 off. In addition, because the voltage at node N2 is high, the voltage at node N4 is low. The signal at node N5 (provided by comparator 20) is low prior to clock signal CLK going high, and therefore the signal at node N6 is high.

TRUTH TABLE

| Time | Signal CLK | Node N2 | Node N3 | Node N4 | Node N5 | Node N6 |
|---|---|---|---|---|---|---|
| 1. Just before signal CLK goes high | L | H | L | L | L | H |
| 2. Just after signal CLK goes high | H | L | H | L | L | H |
| 3. Signal at node N5 goes high | H | L | L | H | H | L |

When signal CLK goes high, the voltage at node N2 goes low, and the voltage at node N3 goes high, thereby turning on transistor Q1. Transistor Q1 turns off either because signal CLK goes low (i.e. circuit 16 returns to the state described in line 1 of the truth table) or because the voltage at node N5 goes high (i.e. the condition described in line 3 of the truth table). If the voltage at node N5 goes high, the voltage at node N6 goes low, the voltage at node N4 goes high, and the voltage at node N3 goes low, turning off transistor Q1. After that, the voltage at node N5 and signal CLK both go low, and circuit 16 returns to the state of line 1 of the truth table.

Figure 4:
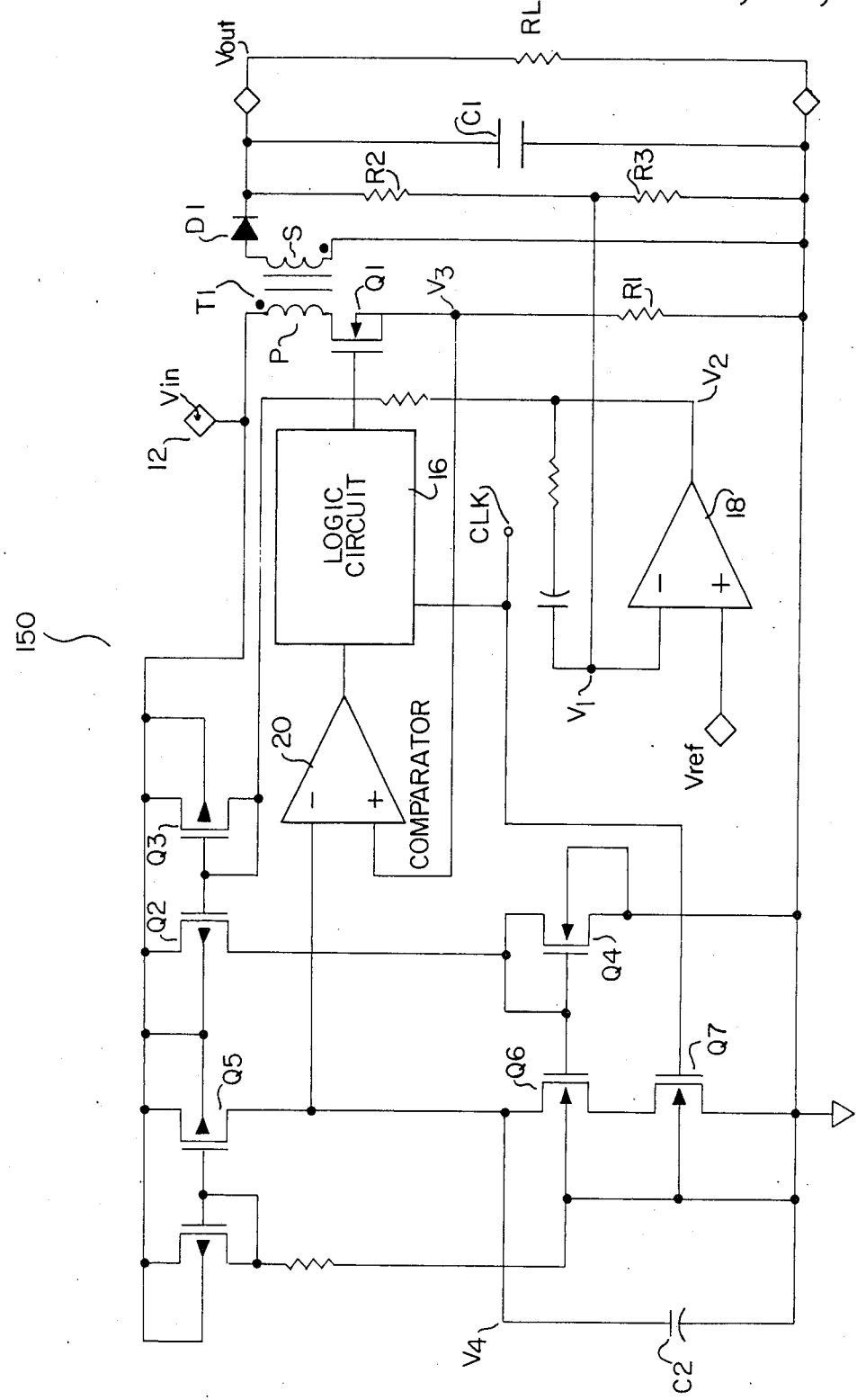
FIG. 4 is a schematic diagram of a power supply constructed in accordance with another embodiment of the invention using an output transformer instead of an inductor.

Referring to FIG. 4, instead of using inductor L1, in another embodiment of the invention a transformer T1 has a primary winding P coupled between input terminal 12 and switching transistor Q1, and a secondary winding S coupled via diode D1 to output load RL and output filter capacitor C1. When switching transistor Q1 is on current flow through primary winding P causes energy to be stored in transformer T1, and when switching transistor Q1 turns off the stored energy is provided via secondary winding S to load RL and output filter capacitor C1. By increasing the turns ratio of transformer T1, secondary winding S will provide large voltage pulses to load RL. Similarly, by decreasing the turns ratio of transformer T1, secondary winding S will provide high current pulses to load RL.

Figure 5:
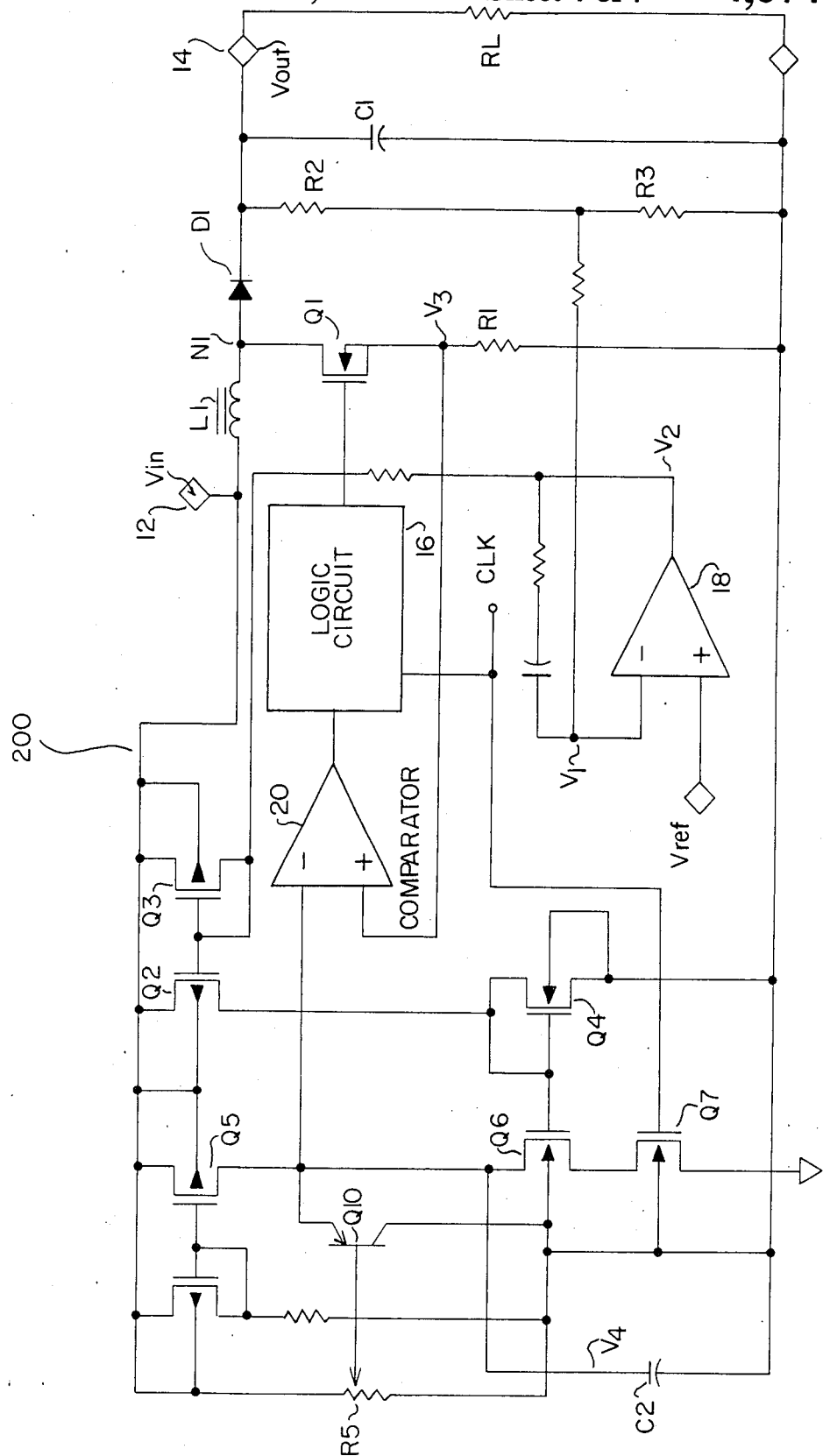
FIG. 5 is a schematic diagram of a power supply constructed in accordance with another embodiment of the invention including a circuit for limiting the voltage applied to comparator 20 prior to the clock transition which turns on transistor Q1.

FIG. 5 illustrates a power supply 200 similar to power supply 100 of FIG. 3, but which includes a variable resistor R5 and a PNP transistor Q10. Resistor R5 and transistor Q10 are coupled to ensure that voltage V4 at the inverting input lead of comparator 20 never rises above a predetermined value fixed by variable resistor R5. In this way, voltage Vmax (the maximum voltage across capacitor C2) can be adjusted to a desired value (less than Vin) in order to ensure that for a predetermined value of current through inductor L1 switching transistor Q1 and resistor R1, comparator 20 will provide a control signal to logic circuit 16 which causes switching transistor Q1 to turn off. In this manner, an upper limit is set for the current through inductor L1, switching transistor Q1 and resistor R1, thereby preventing excessive current flow.

Figure 6:
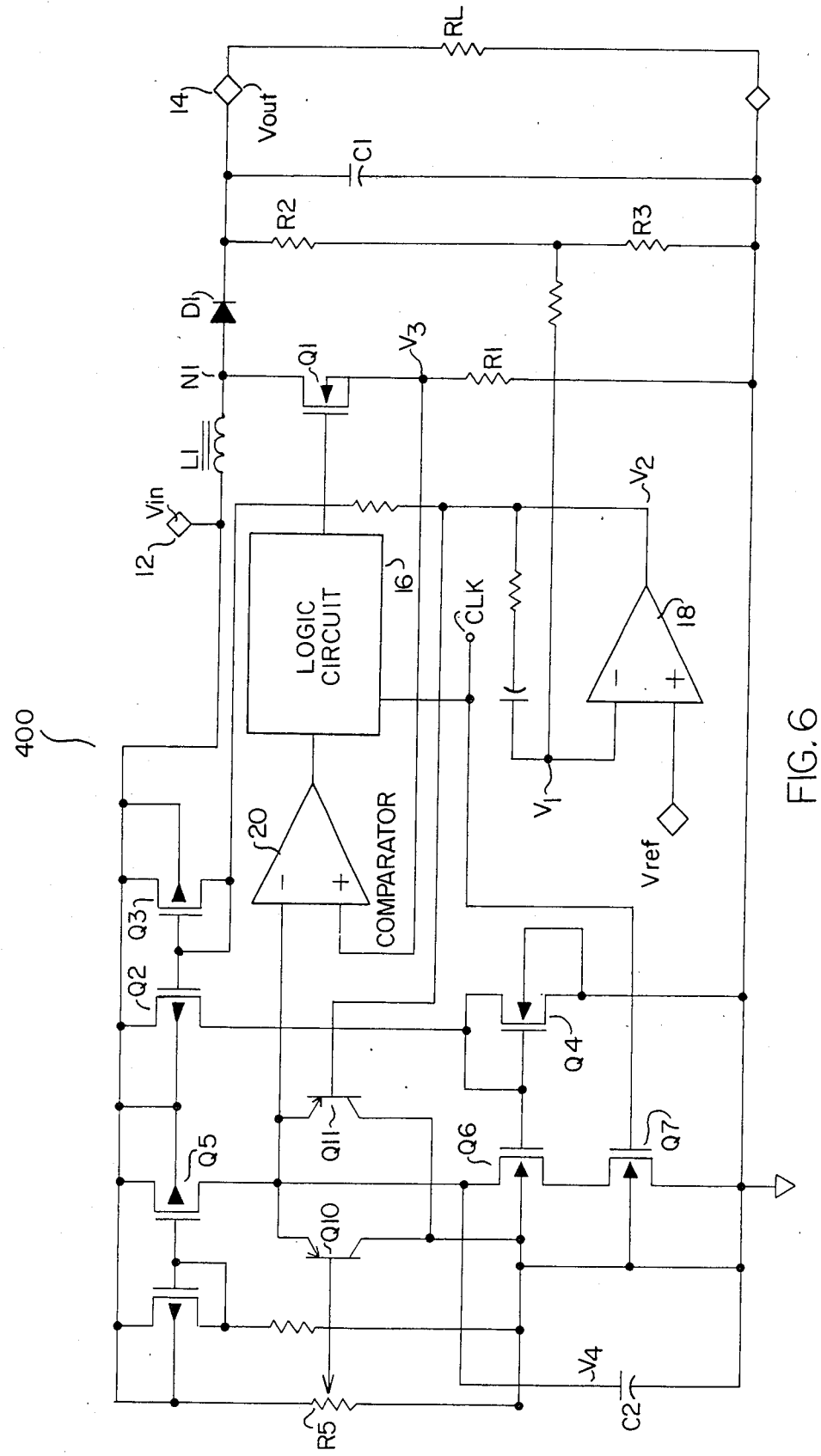
FIG. 6 is a schematic diagram of a power supply constructed in accordance with this invention which includes a feedback current limiter.

Referring to FIG. 6, a power supply 400 is similar to power supply 200 of FIG. 5 but includes a PNP transistor Q11 which prevents voltage V4 at the inverting input lead of comparator 20 from rising higher than 1 diode voltage drop (approximately 0.7 volts) greater than voltage V2 provided by amplifier 18. Specifically, if voltage V4 rises to V2+0.7 volts, transistor Q11 turns on. preventing voltage V4 from rising any higher.

The embodiment of FIG. 6 is relatively insensitive to sudden fluctuations in voltage Vin, especially during low duty cycles of transistor Q1. If voltage Vin suddenly increases, the current through inductor L1 suddenly increases, and voltage Vout increases. By including transistor Q11 of FIG. 6, sensitivity to changes in voltage Vin is reduced. The manner in which this is accomplished is more readily understood with reference to FIGS. 11a and 11b.

Figure 11A:
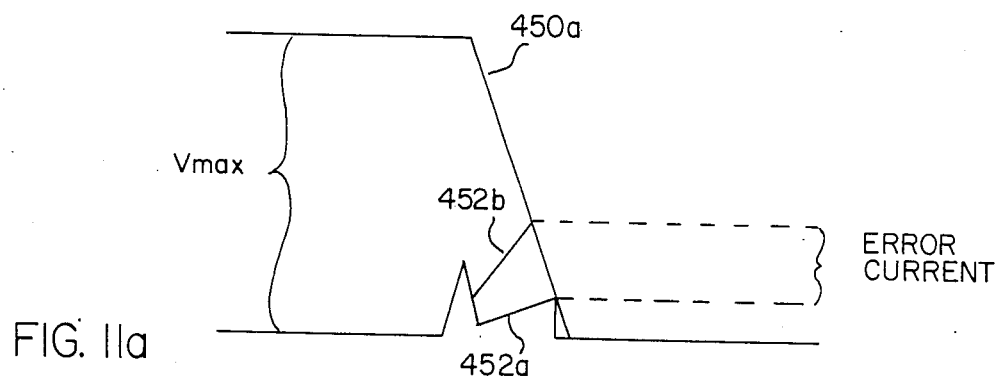
FIGS. 11a and 11b are waveform diagrams illustrating various signals within the power supply of FIG. 6.

Referring to FIG. 11a, a waveform 450a illustrates the relationship between voltage V4 and time if voltage Vmax is fixed. A waveform 452a illustrates the relationship between voltage V3 and time when input voltage Vin is maintained at a constant normal level. A waveform 452b illustrates the relationship between voltage V3 and time if voltage Vin suddenly increases by ΔVin. The current through inductor L1 is greater when waveform 452b intersects waveform 450a than when waveform 452a intersects waveform 450a. In other words, the current through inductor L1 is greater at the time transistor Q1 turns off if voltage Vin suddenly increases than if voltage Vin remains constant.

Figure 11B:
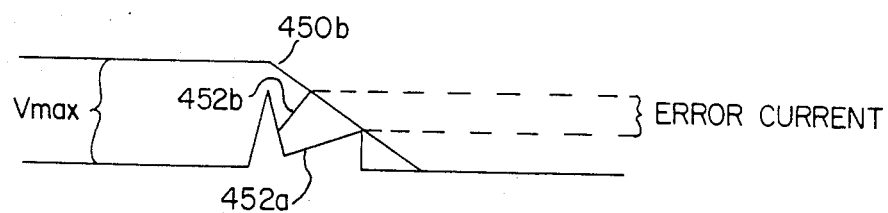

FIG. 11b illustrates the relationship between voltage V4 (waveform 450b) and voltage V3 when voltage Vmax is decreased in response to voltage V2 (which changes in response to voltage Vout). It is seen that the increase in current through inductor L1 caused by a sudden increase in voltage Vin is less than the corresponding increase in current through inductor L1 for the waveforms of FIG. 11a. Accordingly, it will be appreciated by those skilled in the art that the embodiment of FIG. 6 provides enhanced insensitivity to fluctuations in voltage Vin.

While the invention has been described with regard to specific embodiments, those skilled in the art will recognize that changes can be made to form and detail without departing from the spirit and scope of the invention. Accordingly, all such changes come within the present invention.

I claim:

1. A power supply comprising:
    an inductive element;
    a switch coupled in series with said inductive element, said switch periodically opening and closing;
    output terminal for providing power to a load, the power delivered to said load being determined in response to the current through said inductive element just before said switch opens;
    means for generating a first voltage indicative of the current through said inductive element;
    means for generating a second voltage such that said second voltage changes during a time period in which said switch is closed, said second voltage changing at a rate determined by the magnitude of the voltage at said output terminal; and
    a comparator for causing said switch to open, said comparator comparing said first voltage with said second voltage.

2. A power supply comprising:
    an inductive element;
    a switch coupled in series with said inductive element, said switch periodically opening and closing;
    an output terminal for providing power to a load, the power delivered to said load being determined in response to the current through said inductive element just before said switch opens;
    means for generating a first voltage indicative of the current through said inductive element; and
    a comparator for causing said switch to open, said comparator comparing said first voltage with a second voltage, wherein said second voltage decreases from a first predetermined value at a rate determined by the voltage at said output terminal.

3. The power supply of claim 1 wherein said inductive element is an inductor, said power supply further comprising first and second terminals, an input voltage being applied across said first and second terminals, said inductor and said switch being coupled in series between said first and second terminal, a node between said switch and said inductor being coupled to said output terminal so that when said switch is closed, current flows through said first terminal, said switch, said inductor, and to said second terminal, thereby storing energy in said inductor, and when said switch is open, current flows through said inductor and through said output terminal.

4. The power supply of claim 3 further comprising a diode coupled between said output terminal and said node between said switch and said inductor.

5. The power supply of claim 3 further comprising a resistor coupled between said second terminal and said switch.

6. The power supply of claim 1 wherein said inductive element is a transformer having a primary winding and a secondary winding, said power supply further comprising first and second terminals, an input voltage being applied across said first and second terminals, said primary winding and said switch being coupled in series between said first and second terminals, said secondary winding being coupled to said output terminal, wherein when said switch is closed, current flows through said first terminal, through said primary winding and through said switch, thereby storing energy in said transformer, and wherein when said switch opens, the energy stored in said transformer is delivered by said secondary winding to a load.

7. The power supply of claim 6 further comprising a diode between said output terminal and said secondary winding.

8. The power supply of claim 6 further comprising a resistor coupled between said second terminal and said switch.

9. A power supply comprising:
    an inductive element;
    a switch coupled in series with said inductive element, said switch periodically opening and closing;
    an output terminal for providing power to a load, the power delivered to said load being determined in response to the current through said inductive element just before said switch opens;
    means for generating a first voltage indicative of the current through said inductive element;
    a comparator for causing said switch to open, said comparator comparing said first voltage with a second voltage, said second voltage changing at a rate determining by the voltage at said output terminal;
    a capacitor having a lead coupled to said comparator, said lead providing said second voltage;
    means for charging said capacitor to an initial voltage; and
    means for changing the voltage across said capacitor at a rate dependent on the voltage at said output terminal.

10. The power supply of claim 9 wherein said capacitor discharges at a rate dependent on the voltage at said output terminal.

11. The power supply of claim 9 further comprising means for limiting the voltage across said capacitor below a predetermined maximum.

12. The power supply of claim 11 wherein said means for limiting comprises a semiconductor junction coupled between a variable voltage source and said capacitor.

13. The power supply of claim 9 further comprising means for limiting the voltage across said capacitor below a maximum voltage level, said maximum voltage level being responsive to the voltage at said output terminal.

14. The power supply of claim 9 further comprising:
amplifier means for generating an amplifier means output voltage responsive to the difference between a predetermined reference voltage and a voltage proportional to the voltage at said output terminal;
means for generating a first current in response to said amplifier means output voltage; and
means for conducting a second current proportional to said first current, said means for conducting being coupled to said capacitor, the current through said means for conducting discharging said capacitor.

15. A power supply comprising:
an inductive element;
a switch coupled in series with said inductive element;
an output terminal for providing power to a load, the power delivered to said load being determined in response to the current through said inductive element just before said switch opens;
means for generating a first signal indicative of the current through said inductive element;
means for generating a second signal such that said second signal changes during a time period when said switch is closed, said second signal chasnging at a rate responsive to the magnitude of the voltage at said output terminal; and
a comparator for causing said switch to open, said comparator comparing said first signal with said second signal.

16. A method for delivering power to a load, said load being connected to an output terminal, said method comprising the steps of:
providing an inductive element coupled in series with a switch;
providing a first signal indicative of the current through said inductive element;
providing a second signal, said second signal changing during a time period when said switch is closed at a rate dependent on the magnitude of the voltage at said output terminal; and
comparing said first and second signals and opening said switch when said first signal exceeds said second signal, whereby the power delivered to said load is dependent on the current through said inductive element just before said switch opens.

* * * * *

UNITED STATES PATENT AND TRADEMARK OFFICE
CERTIFICATE OF CORRECTION

PATENT NO. : 4,674,020
DATED : June 16, 1987
INVENTOR(S) : Lorimer K. Hill

It is certified that error appears in the above-identified patent and that said Letters Patent is hereby corrected as shown below:

Col. 1, line 66, after "reasons" insert a period.
 Col. 2, line 33, "output.voltage" should read --output voltage--.
 Col. 2, line 56, "inductdr" should read --inductor--.
 Col. 3, line 61, "B MOS" should read --MOS--.
 Col. 4, line 31, "B dependent" should read --dependent--.
 Col. 4, line 38, after "follows" insert a period.
 Col. 6, line 61, "on.preventing" should read --on, preventing--.
 Col. 7, line 38, before "output" insert --an--.
 Col. 8, line 4, "terminal" should read --terminals--.
 Col. 10, line 5, "chasnging" should read --changing--.

Signed and Sealed this

Eighth Day of December, 1987

Attest:

DONALD J. QUIGG

*Attesting Officer*  *Commissioner of Patents and Trademarks*